July 7, 1953  P. E. MERCIER  2,644,654
LANDING GEAR FOR AIRCRAFT
Filed June 1, 1946  3 Sheets-Sheet 1
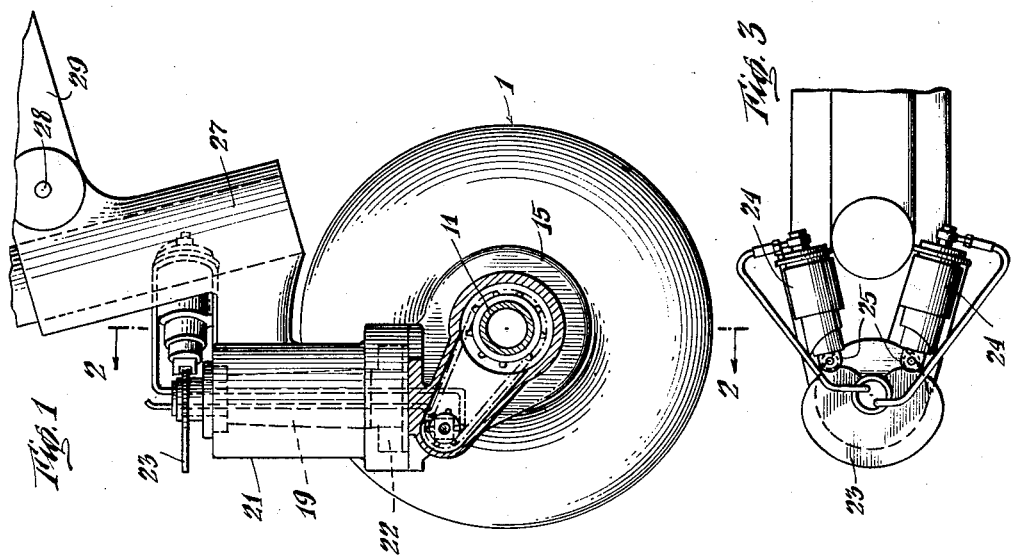
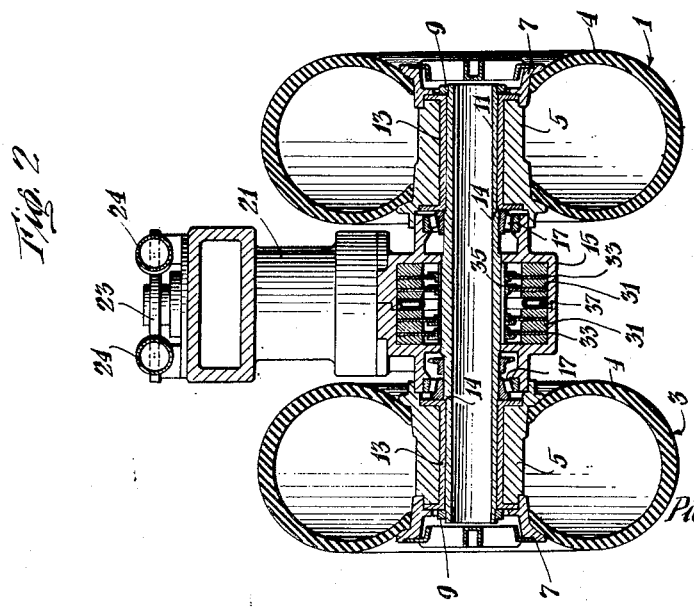
INVENTOR.
Pierre Erneste Mercier
BY George H. Corey
ATTORNEY

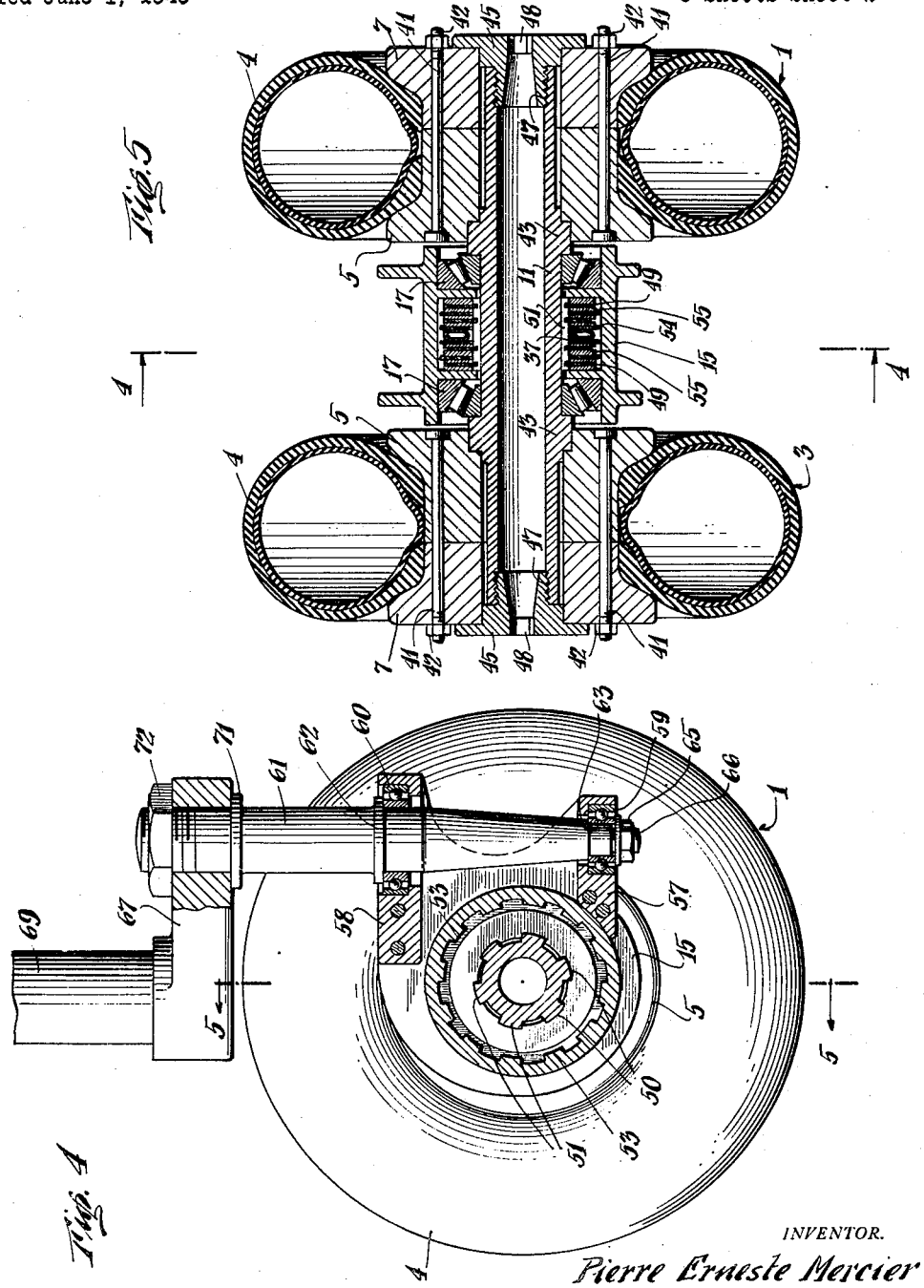

July 7, 1953 — P. E. MERCIER — 2,644,654
LANDING GEAR FOR AIRCRAFT
Filed June 1, 1946 — 3 Sheets-Sheet 3
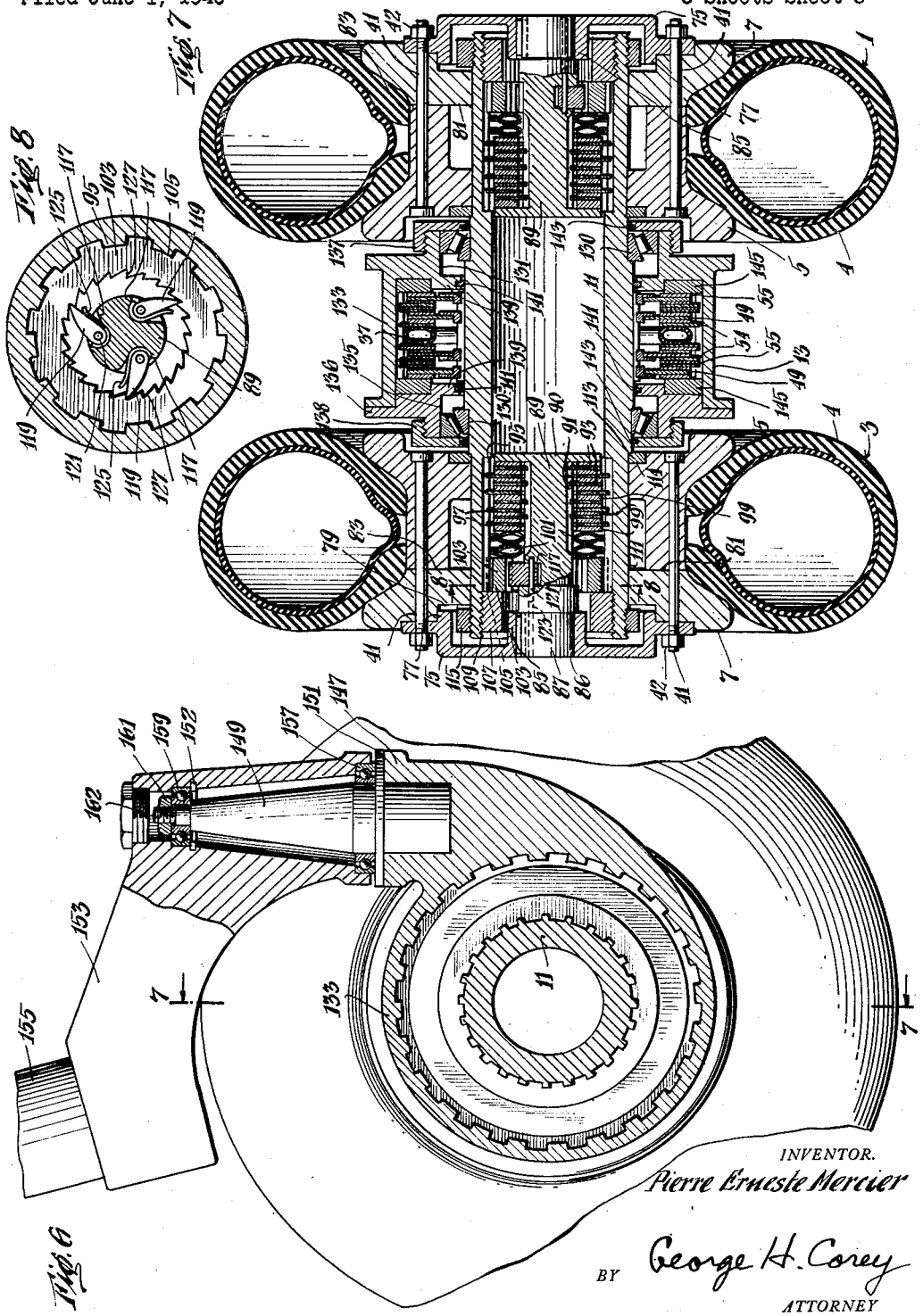
INVENTOR.
Pierre Erneste Mercier
BY George H. Corey
ATTORNEY Patented July 7, 1953

2,644,654

UNITED STATES PATENT OFFICE 2,644,654

LANDING GEAR FOR AIRCRAFT

Pierre Ernest Mercier, New York, N. Y., assignor of one-half to George H. Corey, New York, N. Y.

Application June 1, 1946, Serial No. 673,810

12 Claims. (Cl. 244—50)

This invention relates to improvements in aircraft landing gear and more particularly to landing gear in which one or more of the wheels are mounted for castering action.

This application is a continuation in part of my copending application Serial No. 330,007, filed April 17, 1940, for Landing Gears with Dirigible Landing Wheels, now issued as Patent No. 2,401,364, dated June 4, 1946.

Aircraft landing gear commonly are constructed with three landing wheels. Recent constructions are referred to as the tricycle undercarriage type. In this type landing gear two of these wheels are respectively at either side of the aircraft, for example an airplane, and the third wheel is mounted forwardly of the two wheels so as to facilitate steering which may be accomplished by steering gear connected to this forward wheel. The caster mounting of the wheels may be utilized for the purpose of steering but also has the advantage that the aircraft may be maneuvered on the ground with greater ease. In order to provide sufficient strength to support large aircraft and those heavily loaded and to secure a better distribution of the weight on the ground, dual wheels for each of the three legs of the tricycle gear have been adopted. These wheels associated with each leg have been mounted for rotation one independent of the other. Especially where caster mounting of such dual wheels has been utilized, they are susceptible to "shimmy" or unstable oscillations about the vertical castering axis. Such "shimmy" action unless dampened or prevented not only interferes with the maneuverability and steering but may bring undue stresses on the landing gear and on the aircraft. Where as in some airplane constructions, the landing gear includes a wheel beneath the nose, the "shimmy" action may be aggravated as compared with such action occurring in a trailing wheel located beneath the tail of the plane. Various constructions have been proposed for dampening the oscillations of "shimmy" by location of the wheels with respect to each other and the distribution of the rotating masses and other expedients which have not been entirely successful.

It is an object of the invention to provide a castering landing gear for aircraft in which "shimmy" may be eliminated or counteracted under all conditions of landing, take-off and taxiing and maneuvering on the ground.

It is a further object of the invention to provide a castering landing gear which may be equipped with brakes which cooperate when applied in preventing the "shimmy" action.

It is another object of the invention to provide a steerable castering landing gear which is adapted to prevent "shimmy" and to secure braking action without adversely affecting the steerability of the aircraft when being maneuvered on the ground.

It is a feature of the invention that in a castering landing gear in which two wheels are utilized "shimmy" or sidewise oscillation may be eliminated by coupling the wheels together so that torque is transmitted from either wheel to the other and when "shimmy" tends to occur the two wheels of the set which are supported as a unit in castering relation to the landing gear are constrained to rotate together about the common axis of rotation. When "shimmy" occurs, just as for the case when two wheels on the same axis are moving on a curve, the outer wheel of the set with respect to the instantaneous center of the arc of forward movement tends to rotate faster than the inner wheel. This relation is reversed in the next oscillation. By coupling the two wheels together the wheel which tends to rotate faster is resisted by the reaction of the ground and is held in rotation to the same speed as the inner wheel. While this constraint of the two wheels to rotate at the same speed may result in some tendency to skid, the "shimmy" is immediately counteracted upon the inception thereof. Except when the plane is being steered to move on a curve, the skidding tendency likewise is off-set or does not occur since the "shimmy" does not occur.

The invention, moreover, provides for rotation of the outer wheel of the set when the aircraft is being steered on a curve at a higher speed than the inner wheel with respect to the center of curvature of the path of the aircraft while maintaining the capacity to resist the rotation of one wheel with respect to the other which occurs when "shimmy" occurs. Moreover, the device of the invention provides for effective coupling of the two wheels together when the brake is applied to the set of wheels to slow down or stop the aircraft so that these two wheels are constrained to rotate at the same speed as they decrease in rotative speed and until they are stopped.

In accordance with one form of the invention the torque transmitting anti-shimmy coupling of the dual wheels is accomplished by rigidly connecting these wheels together so that the tread surfaces of these dual wheels remain in a fixed relation to one another. This construction eliminates "shimmy" in the set of dual wheels supported for castering action. Since the acceleration of one wheel results in torsional force being applied to the other wheel tending to effect rotation of this other wheel which is resisted by its contact with the ground, the slipping of the tread of one or the other or of both of the wheels under such conditions may, as above stated, produce some skidding action of the set of wheels but this skidding action is not serious or particularly disadvantageous, especially in large aircraft where dual wheels are necessary or desirable, since such aircraft are maneuvered or relatively large arcs of the curved path. The prevention of "shimmy" becomes the more important factor.

In the embodiment of the invention which is designed for relative rotation of the two wheels in maneuvering the aircraft, the dual wheels are coupled through a torque transmitting friction clutch means. This clutch means permits rotation of one wheel relative to the other, and may be designed and adjusted so that the maximum torsional force which it is capable of transmitting is less than that required to cause slipping of one or both wheels on the ground. This transmittable torsional force, however, is sufficient to resist substantial movement of one wheel relative to the other which accompanies the "shimmy" action and, moreover, is available immediately to resist the "shimmy" action with the result that such action does not start or if it tends to start is dampened and does not become cumulative to produce the severe racking of the structure which ordinarily accompanies "shimmy" action.

In the embodiment of the invention which utilizes a friction clutch for coupling of the two wheels, a locking means may be provided which permits unidirectional rotation of these wheels relative to means connecting the wheels, for example, a shaft upon which and rotatable relative to which they are mounted. This unidirectional means may comprise a ratchet and pawl device which is arranged so that when one wheel tends to accelerate, the pawls thereof engage the ratchet and are effective to drive the shaft at the same speed as the accelerated wheel. The other wheel which is not accelerated or, because of movement of the aircraft on a curve or the condition of the ground, or other reasons may be decelerated, may lag behind the rotation of the shaft concomitantly with slipping of its pawl with respect to a ratchet associated therewith. This means for accommodating the device of the invention in this embodiment to different rotational movement of the two wheels also is adapted to cooperate with braking means which may be so applied, as for example to the shaft, that it is effective concomitantly to reduce the speed of both wheels. When, because the aircraft is moving on a curve or because of a tendency to "shimmy," one wheel is accelerated with respect to the other and drives the shaft ahead of this other wheel, initially the ratchet of this other wheel may slip. When, however, the brake is applied under such conditions to reduce the speed of the shaft the reaction through the ratchet and pawl on the accelerated wheel effects deceleration of this wheel. The deceleration of the shaft and the wheel continues until the speed of the other wheel is equal to the reduced speed of the shaft. Thereupon, the pawls of this other wheel come into engagement with its ratchet and the two wheels then substantially become locked together and function in the manner described above for the embodiment in which the wheels are rigidly coupled together. It will be understood that until such locking of the wheels together is fully effected any rotation of one relative to the other is resisted by the clutch means interposed therebetween.

Other objects and features of the invention will become apparent from the descriptions that follow of the drawings in which:

Fig. 1 is a part side elevation and part vertical section of a steerable landing wheel constructed in accordance with the invention together with a part of a retractable supporting means;

Fig. 2 is a vertical section on line 2—2 of Fig. 1;

Fig. 3 is a top plan view of the gear of Fig. 2 with certain parts omitted and showing the cylinder and cam means for steering the wheel assembly;

Fig. 4 is a section, with certain parts shown in elevation, of another embodiment of the invention;

Fig. 5 is a cross-sectional view on the line 5—5 of Fig. 4;

Fig. 6 is a vertical section, with certain parts shown in elevation, of another embodiment of the invention which includes the clutch means;

Fig. 7 is a cross-sectional view on line 7—7 of Fig. 6;

Fig. 8 is a detail cross-section on line 8—8 of Fig. 7.

In Figs. 1 and 2 are shown the assembly of the pair of wheels 1 and 3 each comprising a tire 4 mounted on rim 5 and retained by rings 7. The rims 5 fit upon bushings 13 which are shouldered against shoulders 14 on the shaft 11 to hold the rim and tire against axial movement upon screwing up the lock nuts 9 which are threaded on shaft 11 and bear against the bushing 13.

The shaft 11 passes through a wheel mounting including the housing 15 and is carried therein by roller bearings 17. The assembly of the wheels 1 and 3 and the shaft 11 constitute therefore a rigid rotatable structure providing two treads for contact with the ground. Under normal straight ahead movement of the structure in the direction perpendicular to the axis of the shaft 11 both wheels will roll on the ground concomitantly with the rotation of the shaft 11 in the bearings 17.

The housing 15 is provided with an upwardly extending shaft 19, Fig. 1, rotatable in its axis on the column 21. Suitable bearings 22 are provided at the lower end of the column 21 to take the upward thrust of the housing 15 and the shaft 19 while permitting rotation on the vertical caster axis by means of cam 23, Figs. 1 and 3, and hydraulic pressure cylinders 24 projecting cam followers 25 into engagement with the cam 23. Steering of the wheel assembly may be accomplished by creating pivotal movement thereof on the vertical caster axis. The column 21 is carried by the frame member 27 pivotally supported at 28 so as to be retractable relative to the frame 29 of the aircraft. It will be understood without departing from the invention that the steering mechanism may be dispensed with and the assembled unit comprising the wheels 1 and 3 and the shaft 11 may be supported in the column 21 for usual caster action by virtue of the off-set of the axis of the shaft 19 from the vertical through the axis of the wheel 1 as shown in Fig. 1. It will be understood, moreover, in consideration of the rigid torque transmitting connection of the wheels 1 and 3 to the shaft 11 that "shimmy" action which may tend to occur in the construction with or without steering mechanism will be prevented by the cooperation of the two wheels in contact with the ground which prevents one rotating ahead or behind the other.

Within the housing 15 annular rings 31 are positioned in spaced relation with plates 33 interspersed therebetween. The plates 33 are fastened to rings 35 of angular section splined on the shaft 11. Centrally of the axial extent of the assembly of rings 31 and plates 33 an expansible element 37 is provided of annular form and of a hollow section. Into the hollow space of this element, hydraulic or air pressure may be introduced, by means not shown, to produce lateral pressure upon the rings 31 to bring them into the frictional engagement with plates 33. There is thus provided a braking means for resisting rotation of the shaft 11 and therefore of the wheels 1 and 3. It will be understood that this braking action may be applied without interfering with the interaction of the two wheels which prevents "shimmy" as above described.

In Figs. 4 and 5 is shown another embodiment of the invention in which the tires 4 of the wheels 1 and 3 are held on the rims 5 by means of the rings 7 and through bolts 41 and nuts 42. The rims 5 at their inner periphery are shouldered against the flanges 43 which are turned on the shaft 11. Flanged retainers 45 are screwed into internal threads 47 in the ends of the shaft 11 and bear upon the assembled rim and ring to hold the rims against these flanges 43 so that the wheels 1 and 3 are rigidly held upon the shaft 11, thereby providing a torque transmitting connection between the wheels. An internal socket 48 is formed in each retainer 45 to effect turning movement thereof in the threads 47.

The shaft 11 is carried in roller bearings 17 mounted in housing 15 within which are positioned plates 49 in which are formed notches 50 to afford sliding movement thereof on the splines 51 formed on shaft 11. Between the plates 49 and slidable on splines 53 formed in the housing 15 cooperating plates 54 are placed, the plates 49 and 54 being provided with friction shoes 55 of suitable material. By means of expansible element 37 similar to that of Fig. 2, the frictional contact of the plates 49, 54 and the shoes 55 may be produced by the introduction of hydraulic or air pressure into the element 37. Such braking action as in the embodiment shown in Figs. 2 and 3 is effective to decelerate both wheels 1 and 3 simultaneously by virtue of the rigid connection thereof to the shaft 11.

As shown in Fig. 4 the housing 15 is provided with laterally projecting brackets 57 and 58 in which respectively are mounted ball bearings 59 and 60. The bearing 60 is driven on the vertical spindle 61 so as to bear against the flange 62 thereof. Bearing 59 is held against the shoulder 63 of the spindle 61 by means of the nut 65 threaded on the end 66 of the spindle 61. The bearings 59 and 60 thus provide not only for rotational movement on the axis of the spindle 61 but also for the thrust carried through this spindle from the arm 67 fastened at the lower end of a steering column 69 substantially in vertical axial alignment with the axis of the shaft 11. The spindle 61 is provided with a flange 71 and is clamped against the arm 67 by means of a nut 72 threaded on the end of the spindle 61. It will be apparent from consideration of Figs. 4 and 5 that castering movement of the assembly which comprises the wheels 1 and 3 rigidly coupled by means of the shaft 11 may take place upon the spindle 61 and that steering of this wheel assembly may be accomplished by means of suitable steering gear connected to the column 69. Whenever "shimmy" tends to take place in the device of Figs. 4 and 5 this action is prevented by the resistance afforded by contact of the tires with the ground at either side of the pivotal axis of the caster provided by the spindle 61 and this resistance is available in whatever position the wheel assembly takes as it is moved by the steering gear.

In the embodiment of the invention shown in Figs. 6 and 7 the tires 4 are carried on rims 5 which are retained by rings 7 and through bolts 41 and nuts 42 similarly to the embodiment of Fig. 5. In this embodiment, however, the through bolts 41 and their nuts 42 also serve to fasten to the rings 7 flanged discs 75 the peripheral edges of which are recessed in the outer faces of the rings 7 as shown in Fig. 7. Upon drawing up the bolts 41 to bring the back faces 81 of the rings 7 into contact with the faces 83 of the rims 5, the respective discs 75 are held rigidly to the wheels 1 and 3. The discs 75 are formed with an internally projecting central hub 85 having a bore 86 fitted upon and keyed to the turned end 87 of a stub shaft 89 upon which is supported friction clutch means as well as ratchet means about to be described. It will be understood therefore that the stub shafts 89 rotate with the respective wheels 1 and 3 by virtue of the rigid fastenings of the discs 75 to the wheels and to the stub shafts.

Slidable on splines 91 formed at the inner end of the stub shaft 89 are annular clutch plates 93. Slidable on splines 95 formed internally of the hollow shaft 11 are cooperating clutch plates 97. Between the adjacent faces of the plates 97 and 93 annular discs 99 of friction material are positioned. By means of spring members, such as Belleville washers 101, and a slidable ring 103 provided with notches 105 fitting in sliding relation to splines 95 of the shaft 11 frictional contact of the annular discs 99 and the plates 93 and 97 is effected when the adjustable retainer 107 threaded into internal threads 109 of the shaft 11 is screwed to bring greater or less pressure on the Belleville washers 101. The amount of the frictional resistance exerted by the plates 93 with respect to the adjacent plate 97 thus may be adjusted. It will be understood that whenever the shaft 11 becomes positively rotated the stub shaft 89 and therefore the wheel 1 or 3 with which it is associated will be induced to rotate by virtue of the transmission of torque through the clutch which comprises the plates 93, 95 and the annular discs 99. It also will be apparent that each of the wheels 1 and 3 may thus rotate relative to the other wheel and relative to the shaft 11 unless compelled to rotate by positive engaging means in the manner about to be described. The stub shaft 89 may be provided with an end flange 90 which serves to retain the plates 93, 97 and the discs 99 against unlimited movement along the stub shaft 89 when pressure is applied thereto by the adjustable retainer 107 and the Belleville washers 101.

In order to provide for proper support of the wheels 1 and 3, that is of their rims 5 and the cooperating rings 7, these rims and rings are bored to fit the turned portion 111 of the shaft 11 so as to be rotatable relative to said shaft to permit the relative movement of the plates and discs 93, 97 and 99 as above described. To prevent undue endwise movement of the rim and wheel assembly, a thrust ring 113 bearing against a shoulder in the shaft 11 as shown in Fig. 7 is positioned to bear against the annular face 114 formed on the rim 5. A retaining ring 115 is threaded on the outer end of the shaft 11 and may be fastened by suitable locking means, not shown, so as to prevent axial movement of the wheels 1 and 3 outwardly with respect to the shaft 11 while permitting rotation thereof on and relative to the turned portion 111 of the shaft 11.

Within recesses 117 formed in the stub shaft 89, as shown in Figs. 7 and 8, pawls 119 are pivotally supported on pins 121 which may be inserted through holes 123 drilled endwise in the stub shaft 89. The pawls 119 are biased outwardly with respect to the axis of the shaft 11, as shown in Fig. 8, by springs 125. The slidable ring 103 has formed on the internal circumference thereof ratchet teeth 127 into engagement with which the springs 125 hold the pawls 119. Rotatable movement of the stub shaft 89 in a counterclockwise direction in Fig. 8 may take place with respect to the ratchet ring 103. When, however, the wheel with which the stub shaft 89 is associated is rotated to produce rotation of the stub shaft in the clockwise direction in Fig. 8, the pawls 119 engaging the ratchet teeth 127 are effective to drive the ring 103 and therefore to drive the shaft 11 through the splines 95 engaging notches 105 of the ring 103. When the shaft 11 thus driven, for example by acceleration of a wheel and its stub shaft 89, is rotated ahead of the other wheel, the ratchet ring 103 of said other wheel will rotate ahead of the stub shaft and the pawls carried thereby associated with said other wheel to cause the pawls to slip over the ratchet teeth 127. If now said other wheel becomes accelerated or if by means of the brake device about to be described the speed of the shaft 11 is reduced the pawl 119 of said other wheel will engage the ratchet teeth 127 of the ring 103 of said other wheel whenever the speed of the shaft becomes equal to the speed of said other wheel. Thereafter, and particularly with continued braking action exerted upon the shaft 11, said other wheel becomes locked to said shaft 11 and therefore by virtue of the engagement of the pawls and ratchet of the first wheel will become rigidly coupled to the first wheel. It thus will be apparent that during the reduction of speed of the wheels effected by braking action upon the shaft 11 the embodiment being described becomes exactly equivalent to that shown in Fig. 2. It also will be understood, however, that when for any reason the speed of one wheel is reduced relative to that of the other, the ratchet device permits rotation of the slower wheel relative to the faster wheel. In such case, however, the frictional resistance of the clutch means constituted by the plates 93 and 97 and the annular discs 99 at once comes into play to resist such relative motion. If such relative motion is caused by "shimmy" action, this "shimmy" action is resisted or prevented.

In the embodiment of Figs. 6 and 7 the shaft 11 is carried in roller bearings 130 which fit upon the shouldered portions of shaft 1. The outer races of the bearings 130 are fitted respectively in a counter bore 131 of the wheel mounting housing 133 and in a counterbore 135 of a flanged member 136 which is fastened at one face of the housing 133. These outer races of the bearings 130 are retained in place by screw rings 137 and 138. The housing 133 and the flanged member 136 are provided with inwardly projecting flanges 139 provided with sealing rings 141 fitting against the shaft 11. The inwardly projecting flanges of the screw rings 137 and 138 also are provided with sealing rings 143 fitting against the shaft 11 and cooperating with the sealing rings 141 to prevent oil leakage from the bearing 130.

Within the chamber formed between inwardly projecting portions 139 of the housing 133 and the flanged member 136 a brake mechanism similar to that described in connection with Fig. 5 is operatable in the same manner by delivering to the hollow space of the expansible element 37 a fluid under pressure to force the plates 49 and 54 and the shoes 55 into frictional contact, these plates moving oppositely in the axial direction against the friction rings 145 which bear against the inner annular surfaces of the housing 133 and the flanged member 136. The operation of the brake composed of these plates and shoes and the element 37 is similar to that described in connection with Figs. 2 and 5 to effect retardation of rotation of shaft 11 and thereby of the wheels 1 and 3.

The housing 133 is provided with a spindle supporting hub 147, Fig. 6, in which a spindle 149 is held with its axis vertical and with its lower end fastened in the hub 147. The axis of the spindle 149 is off-set from the axis of the shaft 11 to provide castering action of the wheel assembly and the wheels 1 and 3 on the axis of the spindle 149. The spindle 149 is provided with a flange 151 bearing against the faced horizontal surface of the hub 147 to receive the load transmitted through this spindle 149 from the bracket 153 carried by the steering column 155. The bracket 153 is counterbored at its lower end to receive the ball bearing 157 and at its upper end to receive the ball bearing 159, the outer races of these bearings being fitted with a driving fit in these counterbores. The bearing 159 is detained at the upper end of the spindle by nut 161 threaded on the end 162 of the spindle 149, the inner race of the bearing 159 fitting against the shoulder on by the spindle 149. The outer race of the bearing 159 is retained in the bracket 153 by means of the spring washer 152. The axis of rotation of the steering column 155 is inclined to the vertical but passes through the axis of rotation of the shaft 11 thus throwing the point of contact of the wheels 1 and 3 somewhat rearwardly of the point at which the steering column axis intersects the ground. It will be understood that the construction of Figs. 6, 7 and 8 provides for caster mounting of the wheel assembly which comprises the dual wheels 1 and 3 in a landing gear which is provided with a steering gear constructed to produce pivotal action of the wheel assembly on a steering column axis is other than the castering axis. The wheel assembly comprising the wheels 1 and 3 in this embodiment, as in that of Figs. 4 and 5, as a whole and including the brake mechanism as well as the clutch device above described, is free to caster and therefore subject to the tendency to "shimmy." Such "shimmy" action however is prevented or counteracted both in free rolling of the wheels as well as in braking thereof by virtue of the clutch and ratchet devices which are associated with the wheels and the shaft on which they are mounted.

Other embodiments and variations from the constructions disclosed herein may be made within the scope of the invention and all such variations are intended to come within the scope of the claims appended hereto.

I claim:
1. An aircraft landing gear having in combination a castering wheel mounting, a shaft supported by said mounting for rotation on its axis relative thereto, a pair of rotatable surface contacting elements carried by and rotatable upon said rotatable shaft, clutch means for transmitting torque between each of said surface contacting elements and said rotatable shaft, said clutch means being adjustable to predetermine the torque value which causes slippage between said surface contacting elements and said shaft, and uni-directionally acting means connected between each of said surface contacting elements and said shaft for preventing rotation of said surface contacting elements upon said shaft in one direction and allowing rotation of said surface contacting elements upon said shaft in the opposite direction.

2. An aircraft landing gear having in combination a castering wheel mounting, a shaft supported by said mounting for rotation on its axis relative thereto, a pair of wheels rotatable on and relative to said shaft and in spaced relation therealong, ratchet and pawl means operatively connecting each of said wheels with said shaft for permitting rotation of said shaft on its axis in a given direction relative to both said wheels while effective positively to connect said shaft and wheels to prevent rotation of said shaft relative to the respective wheels in the opposite direction of rotation of said shaft relative to said wheels, and means carried by said mounting for effecting braking action on said shaft, whereby said ratchet and pawl means are effective to lock said wheels to said shaft for rotation therewith.

3. An aircraft landing gear having in combination a castering wheel mounting, a shaft supported by said mounting for rotation on its axis relative thereto, a pair of wheels rotatable on and relative to said shaft and in spaced relation therealong, ratchet and pawl means operatively connecting each of said wheels with said shaft for permitting rotation of said shaft on its axis in a given direction relative to both said wheels while effective positively to connect said shaft and wheels to prevent rotation of said shaft relative to the respective wheels in the opposite direction of rotation of said shaft, and a clutch operatively connecting each of said wheels with said shaft and effective to permit said rotation of said shaft in said given direction relative to either wheel when the other wheel is positively connected to said shaft by said ratchet and pawl means and is effective to produce a torque in said clutch in excess of a predetermined torque.

4. In an airplane, a landing gear having in combination a wheel mounting, a steering column rotatable about a generally vertically extending axis and connected to said wheel mounting to support said mounting for pivotal movement thereof upon said vertically extending axis, shaft bearing means having a horizontal axis carried by said mounting, the vertical plane through said horizontal axis of said shaft bearing means being spaced rearwardly from said vertically extending axis of the steering column with respect to the direction of movement of the airplane, a wheel shaft journalled in said shaft bearing means, and a pair of wheels in spaced relation along and keyed on said wheel shaft.

5. An aircraft landing gear comprising a wheel mounting, a shaft rotatable in said mounting about a substantially horizontal axis, a pair of wheels carried by said shaft on opposite sides of said mounting, clutch means for transmitting torque in both directions between said wheels and said shaft so that rotation of one wheel drives the other wheel through said clutch means and said shaft, said clutch means being effective to yieldably resist relative rotation of said wheels and thereby prevent twisting of said mounting when said wheels are rotated by contact of the landing gear with the ground, means for preventing forward rotation of the wheels with respect to the shaft, and means for braking the shaft.

6. In an airplane landing gear in which a support is secured to the airplane and a wheel supporting unit including a pair of landing wheels is mounted on said support for pivotal movements about a vertical axis, in combination, means for applying a steering force to said unit from a power source carried by said airplane, and means for transmitting torque in both directions between said wheels so that rotation of one wheel tends to drive the other wheel through said torque transmitting means, and means operatively interposed between said torque transmitting means and said wheels for resisting relative rotation of said wheels when said wheels are in engagement with a ground surface during landing, take-off and taxiing movements of the airplane.

7. In an airplane, a steerable landing gear comprising a mounting, an upwardly extending support for said mounting secured to said airplane, a pair of ground engaging elements movably supported on opposite sides of said support, means for applying a steering force to said ground engaging elements from a power source carried by said airplane, and means connecting said ground engaging elements together for movement in the same direction and at the same speed when said elements are in engagemnt with a ground surface during landing, take-off and taxiing movements of said airplane.

8. In an airplane, a steerable landing gear comprising a wheel mounting, a support for said mounting secured to said airplane, a shaft rotatable in said mounting about a substantially horizontal axis, a pair of pneumatically tired wheels mounted in substantially spaced relation on said shaft, means for applying a steering force to said landing gear from a power source carried by said airplane, and means for transmitting torque in both directions between said wheels and said shaft so that rotation of one wheel tends to drive the other wheel through said torque transmitting means and said shaft, said torque transmitting means being effective to resist relative rotation of said wheels when said wheels are in engagement with a ground surface during landing, take-off and taxiing movements of said airplane, and braking means associated with said shaft and operatively connected to said shaft to produce a braking action on said wheels.

9. A steerable landing gear as defined in claim 8 in which the torque transmitting means includes a pair of continuously engaged friction clutches, one connected between each wheel and said shaft.

10. In an airplane landing gear including a wheel supporting unit carrying a pair of steerable landing wheels and steering means for applying a steering force to said wheel supporting unit, in combination, means supporting said landing wheels in axial alignment and substantially spaced axially from one another and means connecting said wheels together to cause them to resist any tendency to relative rotation of one with respect to the other when said wheels are in engagement with a ground surface during landing, take-off and taxiing movements of the airplane.

11. In an airplane landing gear including a wheel supporting unit carrying a pair of steerable landing wheels and steering means for applying a steering force to said wheel supporting unit, in combination, a shaft supporting said wheels in spaced relation axially thereof and friction cultch means connecting each of said wheels to said shaft to cause them to resist any tendency to relative rotation with respect to said shaft within a predetermined torque range when a torque is applied to either of said wheels through engagement with a ground surface during landing, take-off and taxiing movements of the airplane.

12. In an airplane landing gear including a wheel supporting unit carrying a pair of steerable landing wheels and steering means for applying a steering force to said wheels, in combination, a shaft supporting said wheels in spaced relation axially thereof and means rigidly connecting said wheels to said shaft to prevent relative rotation of said wheels with respect to said shaft or to each other when a torque is applied to either of said wheels through engagement with a ground surface during landing, take-off and taxiing movements of the airplane.

PIERRE ERNEST MERCIER.

References Cited in the file of this patent

UNITED STATES PATENTS

| Number | Name | Date |
| --- | --- | --- |
| 1,438,051 | Moakler | Dec. 5, 1922 |
| 2,199,966 | Timm | May 7, 1940 |
| 2,213,383 | Canfield | Sept. 3, 1940 |
| 2,243,569 | Miller | May 27, 1941 |
| 2,263,805 | Haddon | Nov. 25, 1941 |
| 2,291,571 | Cleveland | July 28, 1942 |

FOREIGN PATENTS

| Number | Country | Date |
| --- | --- | --- |
| 221,907 | Great Britain | Sept. 25, 1924 |
| 535,038 | Great Britain | Mar. 26, 1941 |